United States Patent [19]

Stewart et al.

[11] Patent Number: 4,924,100
[45] Date of Patent: May 8, 1990

[54] STRAIN AND TEMPERATURE MEASUREMENT

[75] Inventors: Peter A. E. Stewart; Peter H. Fowler, both of Bristol, England

[73] Assignee: ROLLS-ROYCE plc, United Kingdom

[21] Appl. No.: 192,620

[22] Filed: May 11, 1988

[30] Foreign Application Priority Data

May 14, 1987 [GB] United Kingdom ............... 8711327

[51] Int. Cl.$^5$ ............................................ G01N 23/206
[52] U.S. Cl. ........................... 250/390.09; 250/390.01
[58] Field of Search ................. 250/390.01, 390.09, 250/390.08, 390.07

[56] References Cited

FOREIGN PATENT DOCUMENTS

| 1154653 | 9/1963 | Fed. Rep. of Germany | 250/390.01 |
|---|---|---|---|
| 2167280 | 5/1986 | United Kingdom | 250/390.01 |
| 2168805 | 6/1986 | United Kingdom | 250/390.01 |
| 2192055 | 12/1987 | United Kingdom | 250/390.01 |

OTHER PUBLICATIONS

Bloch et al., "Neutron Scattering at High Pressure", *Rev. Scien. Instrum.*, vol. 47 (No. 3), Mar. 1976, pp. 296–298.
Kamigaki, "A High-Pressure Apparatus for TOF Neutron Diffraction", *Japanese J. Applied Physics*, vol. 19, Dec. 1980 (No. 12), pp. 2507–2508.
Harms et al., "Temperature Sensing by Neutron Transmisson", *Nuclear Instrum. and Methods*, vol. 104 (No. 1), Oct. 1972, p. 217.
Sinclair et al., "Structural Studies of Amorphous Materials Using a Pulsed Neutron Source", *Nuc. Instrum. and Methods*, vol. 117 (No. 2), May 1974, pp. 445–454.
McWhan et al., "Apparatus for Neutron Diffraction at High Pressure", *Review Sci. Instrum.*, vol. 45 (No. 5), May 1974, pp. 643–646.
Draperi et al., "Neutron Scattering by Single Crystals under High Uniaxial Stress", *Journal of Physics E: Scientific Instruments*, 1976, vol. 9, pp. 174–175.

*Primary Examiner*—Janice A. Howell
*Assistant Examiner*—Richard Hanig
*Attorney, Agent, or Firm*—Oliff & Berridge

[57] ABSTRACT

A method of non-invasively measuring strain and temperature of an object, substantially simultaneously, using neutrons of selected energy levels is described. A pulsed neutron source is made to emit thermal and epithermal neutrons in a collimated beam directed at a target object. Temperature is monitored by observing the thermal Doppler broadening of resonances in the neutron transmission characteristic for the epithermal neutrons and strain is measured from observations made of changes to the thermal neutron diffraction pattern.

7 Claims, 3 Drawing Sheets

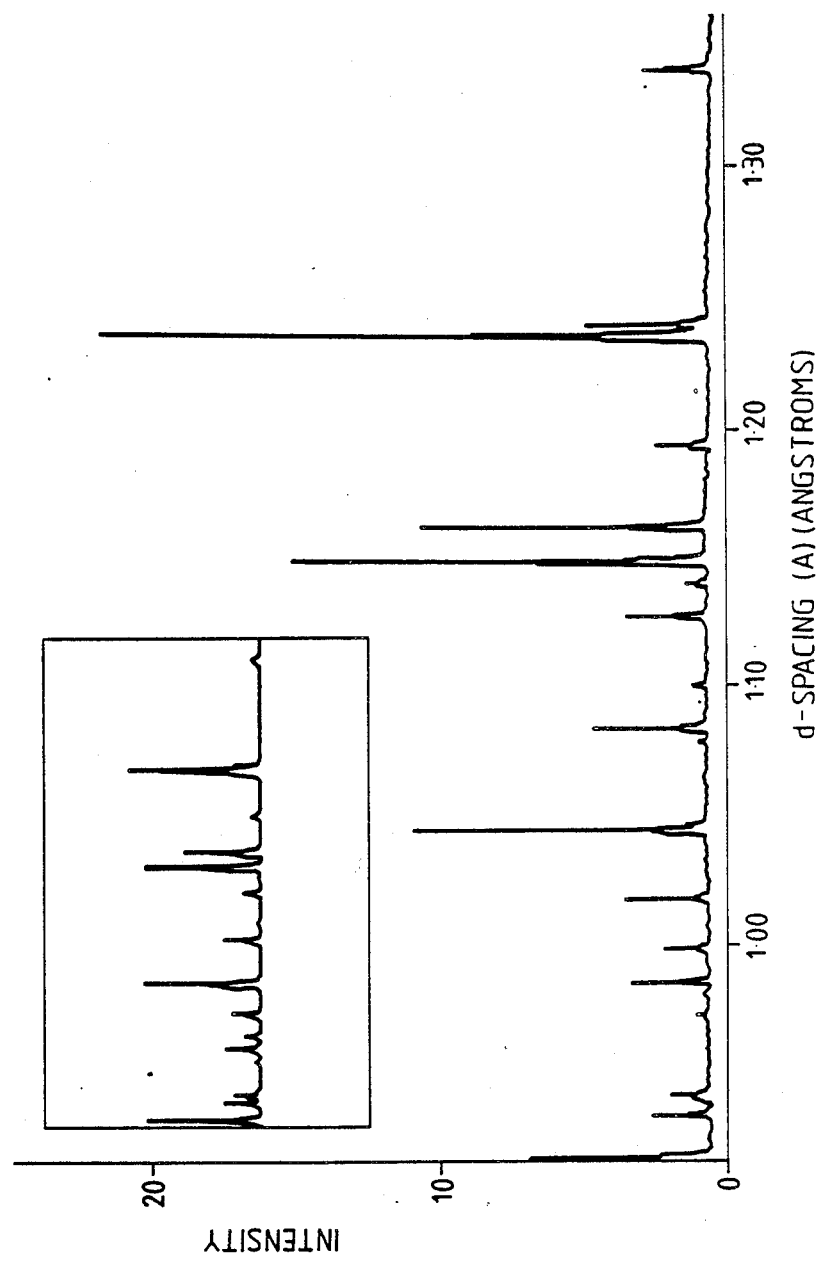

STRAIN AND TEMPERATURE MEASUREMENT

The invention concerns a method and apparatus for measuring strain of working machinery using a non-invasive technique. The technique is particularly suitable for measuring strain and temperature of an object or machine simultaneously.

The technique employs measurement of the transmission of epithermal neutrons through the object to give an accurate temperature estimate, and the measurement of the transmission and diffraction of near thermal neutrons to gather information about the crystal lattice strain in the object. GB Patent Application 2,168,805 describes a technique for measuring the temperature of an object by observing the effect on a beam of incident neutrons or the absorption of scattering cross-section of one or more elements present in the object. An improvement to the technique proposed in GB 2,192,055 involves selective temperature measurement by the provision of regions of a further element or elements, otherwise substantially absent from the bulk of the object. The selected elements possess particularly advantageous neutron resonance characteristics which affect the measured cross-sections in dependence upon temperature gradients in the object. The present invention involves a related technique.

According to the present invention a method of measuring the strain present in an object comprises exposing the object to a beam of neutrons, monitoring the distribution of neutrons issuing from the object in substantially perpendicular directions.

Apparatus for carrying out the invention includes at least two multi-pixel arrays of devices responsive to the incidence of neutron particles.

In one embodiment of the invention a neutron responsive device is disposed to monitor neutron transmission characteristics of the object and may be used additionally for the purpose of temperature measurement.

The method involves, and the apparatus is arranged for, measurement of time of flight of neutrons from a neutron source to impingement upon a neutron responsive device in the monitoring arrays.

The invention will now be described by way of example only, with reference to the accompanying drawings, in which:

FIG. 3 illustrates a neutron diffraction pattern for a metal powder.

It is well known that for certain materials narrow neutron resonances in the transmission characteristics for epithermal neutrons are broadened by thermal motion of the target atoms through the Doppler effect. This broadening is always present, but is made manifest at neutron energies close to a resonance where the probability for neutron interaction with the nuclei of the target is large and changes rapidly with energy.

Figure 1A:
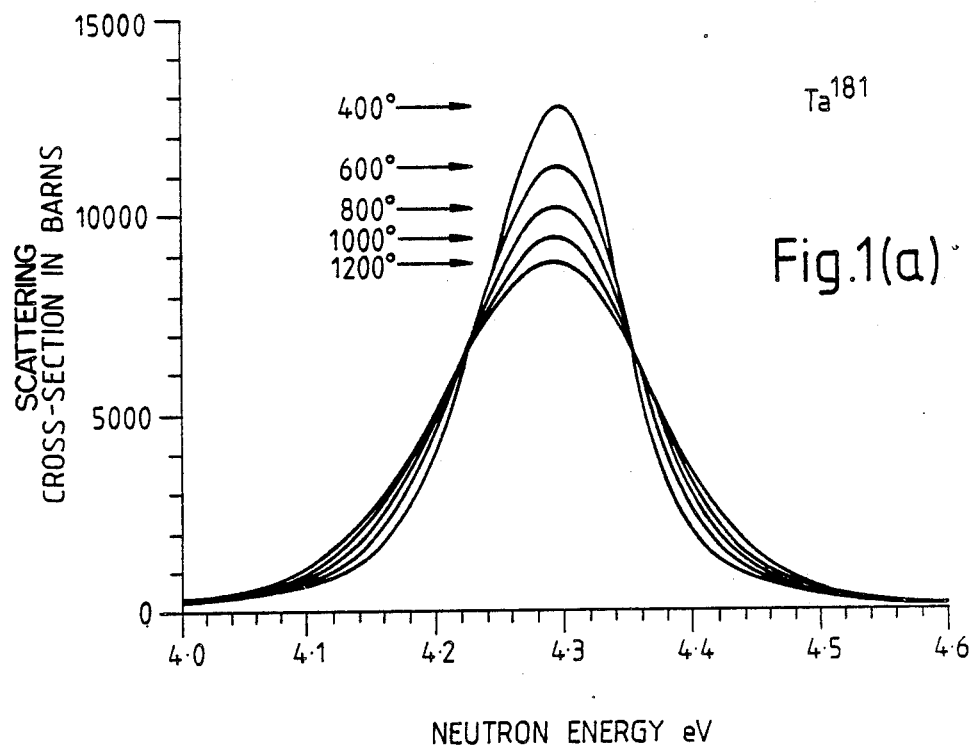
FIG. 1 illustrates at (a) the broadening effect of temperature on the scattering cross-section of the 4.2 eV resonance of Tantalum 181, and that of (b) the effect of this on the corresponding cross-section.
Figure 1B:
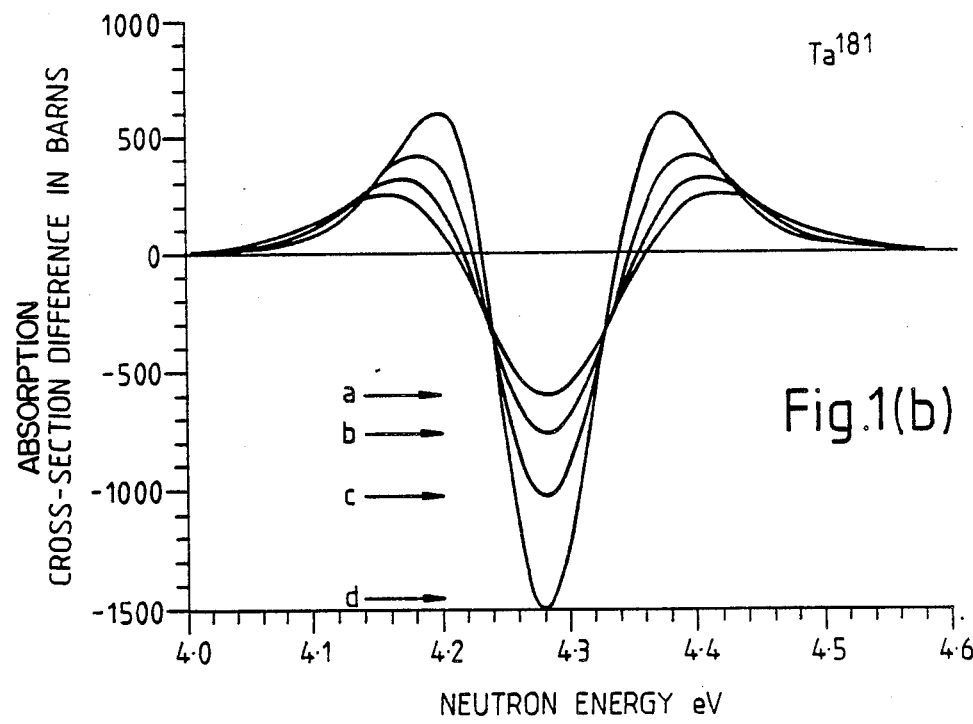

The effect of the blurring so produced is displayed in FIG. 1 which shows the calculated effects on the cross section for capture in the region of an important neutron resonance, that for tantalum at 4.28 eV. FIG. 1(a) illustrates how the broadening develops with increasing temperature, and FIG. 1(b) shows how the change in effective cross section alters with successive increments of 200° K. For a fairly wide selection of heavy elements (Z>42) suitable narrow resonances indeed occur in the energy range 1–100 eV. Particularly suitable for use in this technique are elements with intense narrow resonances such that little of the element is necessary to provide a deep absorption line suitable for accurate measurement.

The measurements necessary to determine the cross section versus neutron energy with accuracy in the epithermal area are best performed using a pulsed neutron source. One then obtains the energy by direct measurement of time of flight of the neutron between moderator and detector.

It is important to recognize that the temperature determined is that of the chemical element responsible for the particular resonance, and so applies to that particular component and not to the intervening or background material penetrated by the neutrons. Thus the temperatures measured on each resonance applied to the particular Ta, W and Hf isotopes, which in this case were in the specimen only, and not in the stainless steel oven walls. Additionally, if the surface of an internal component is plated with, say, 50 μm of iridium (which will not be found elsewhere in the field of view) the temperature estimates based on the iridium resonances will apply just to this surface coating. Equally, second or third elements could be applied elsewhere and their temperatures determined in the same exposures and in the same pixels in the field of view of the device. Thus, one can expect to build a quite detailed three-dimensional picture of the temperature field of a critical component.

It is proposed to measure the lattice parameters of the specimen at the same time as the temperature determination. This uses the near thermal neutrons that are produced at the same time by the neutron source and its moderator, and, if a pulsed source is used, arrive a few milliseconds later than the epithermal neutrons used in the resonance transmission measurements described above.

It is a consequence of the dual nature of particles and waves that thermal neutrons have a de Broglie wavelength of the same order of magnitude as the interatomic spacing of metallic crystals. Thus, when thermal neutrons are directed onto a metal crystal it acts as a three-dimensional grating and diffraction phenomena occur in a manner directly similar to X-ray diffraction. The diffraction effects can be used to locate atomic positions in a crystal lattice, because the de Broglie wavelengths of thermal neutrons is comparable to the wavelengths of X-rays used in X-ray diffraction methods essentially the same methods and formulae can be used.

Despite the similarity with X-ray diffraction there are significant differences in the scattering of neutrons. The main difference arises due to the short range interaction of a neutron with the nucleus of a target atom which produces isotropic scattering, because the nucleus acts essentially as a point scatterer.

The directions in which neutrons are scattered from the target varies with the solid angle. Almost none travel in some directions, but in other directions large numbers will be detected. The numbers are concentrated in these particular directions because of the relationship between the neutron energy wavelength and the spacing between atoms in particular planes through a crystal. Additionally, of course, the directions are determined by the orientation of the crystal planes with respect to the direction of the incident neutron beam. Thus, the diffracted neutron distribution is changed by both a change in the temperature of the target and by mechanical deformation. Therefore, the mechanical strain experienced by a solid target at constant temperature can be determined by tracking the change in the angular distribution of the directions of diffracted neutron concentrations.

Basically, the technique employed in the present invention involves determining the magnitude and orientation of changes in the strain ellipsoid of the target by tracking changes in its neutron diffraction pattern as seen in the three detector directions, and, more or less simultaneously, determining the temperature of the target by means of neutron resonance radiography.

Figure 2:
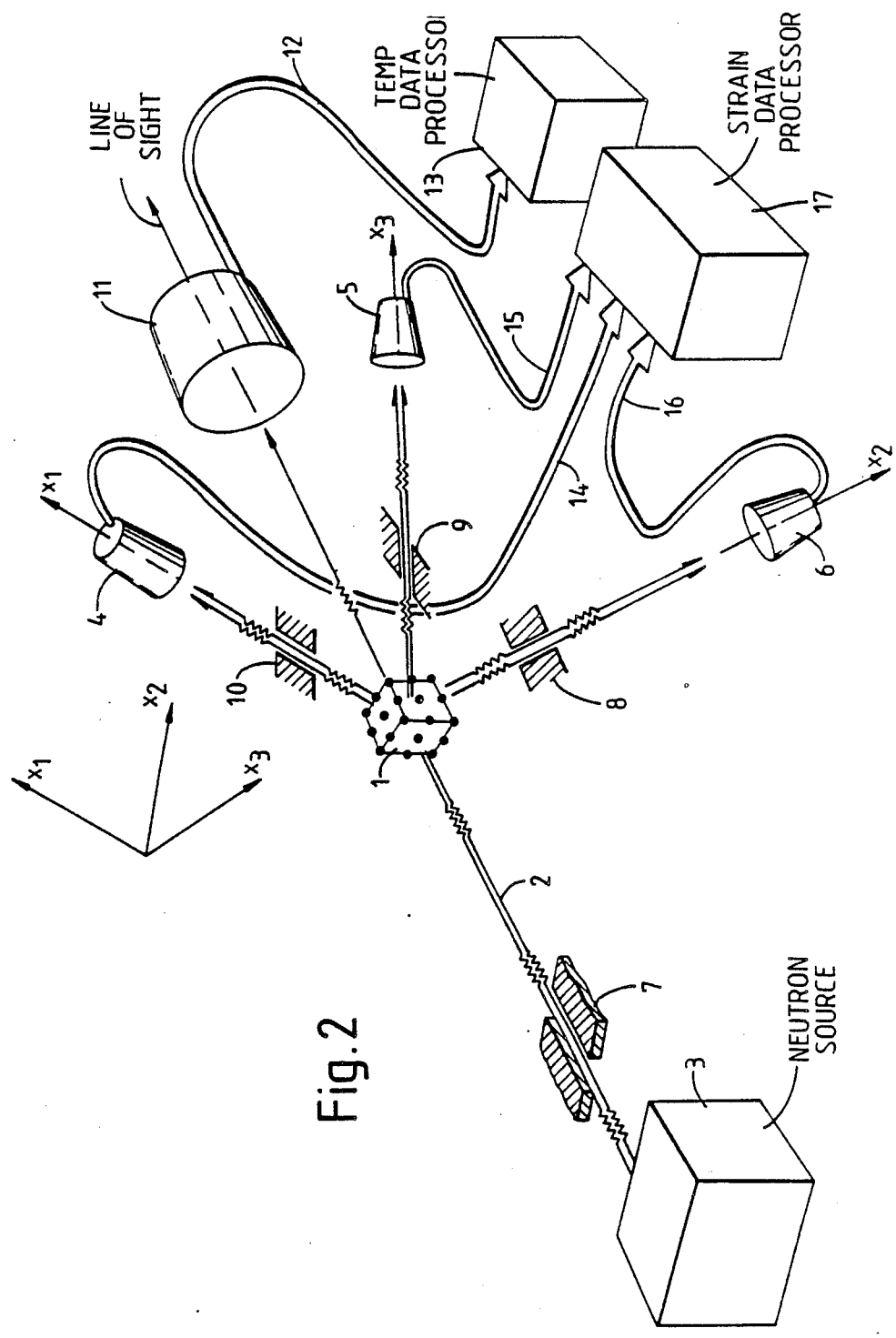
FIG. 2 is a schematic illustration of an apparatus for performing simultaneously measurements of temperature and strain using neutrons.

FIG. 2 is a schematic illustration of a general arrangement of apparatus for carrying out simultaneous strain and temperature measurements on a test object 1 using a single neutron beam 2 from a pulsed neutron source 3. In order to study the arrangement of atoms in the crystals contained within the material of the object 1 it is necessary to use neutrons which are moving very slowly. More precisely, it is necessary to use neutrons having an energy level such that they possess a de Broglie wavelength matching the interatomic spacing of the crystal lattices. For metallic elements of present interest thermal neutrons having energies around 0.02 eV have appropriate wavelengths. The wavelength of thermal neutrons is roughly the same order of magnitude as the wavelength of X-rays, thus, the same basic techniques and formulae for collecting and interpreting data are employed.

Neutrons scattered from the target 1 are detected by neutron detectors 4, 5 and 6 aligned along axes having a common origin within the target. For resolution of the strain ellipsoid vectors two of these axes, x1 and x2, are aligned at right angles to each other with the third axis x3 positioned along a direction selected to provide data capable of resolving ambiguities in the interpretations of the daga from the other two axes. These detectors preferably comprise arrays of pluralities of individual neutron detectors disposed along an arcuate sector or surface centred about the common origin of the axes. thus, at least one of the arrays may comprise a complete, or virtually complete ring of neutron detectors.

Changes in the diffraction pattern are thus observed from a plurality of spatially distributed positions. In order to be able to monitor a precise location within the target the three axes x1, x2 and x3 are aligned with a common origin in the path of the incident neutron beam 2 and all four beams are closely collimated by neutron beam collimators 7, 8, 9 and 10. The beam width, that is its transverse dimension, defines the resolution of the system.

In addition to the three detectors 4, 5 and 6 a further multi-pixel detector 11 is positioned on the line of sight of beam 2 to measure transmitted neutrons. The output from detector 11 is connected via a connection 12 to and accumulated by a temperature data processor 13. As previously mentioned the resonance characteristics employed for temperature determination are produced by epithermal neutrons. Preferably, therefore, only data corresponding to the detection of neutrons having an energy in the epithermal band are counted by detector 11 and recognized by temperature data processor 13. This will be done by time of flight measurement synchronized to the operative cycle of the pulsed neutron source 3. Only neutrons arriving within the limits of the correct time slot are counted. The exact time of detection of each counted neutron is logged as this gives its elapsed time of flight and, therefore, its particular energy level. Over the period of measurement the data accumulates to form an intensity against energy spectrum characteristic containing a number of resonances from which the temperature of the target may be determined as described in GB 2,168,805.

Epithermal neutrons having higher energies travel faster and, therefore, arrive earlier than the thermal neutrons employed for strain measurement. Although, the neutron diffraction process inherently involves a degree of natural selection, in so far as only thermal energy neutrons will satisfy the Bragg conditions for diffraction accurate time of flight measurement is essential for precise measurement of the lattice parameters. It is necessary to measure the time of flight sufficiently accurately to calculate the energy of the scattered neutrons to a precision of 1 in 10,000 or better for the required wavelength calculations.

Strain related data comprising the angular orientation of the detectors 4, 5 and 6 and the numbers of neutrons detected at each location is supplied via connections indicated at 14, 15 and 16 to a strain data processor 17. Strain measurements are made on the object 1 under different conditions and differences in the data collected by detectors 4, 5 and 6 are compared to determine changes in the shape of the strain ellipsoid for the target. Residual strain will also be determined from the evaluation of the strain ellipsoid in the absence of any externally applied forces.

Neutron diffraction is an established technique to determine details of the structure of crystalline materials, and present instrumentation and data analysis can be utilized with little difficulty to make the measurements required in this proposal for stationary specimens. Moving targets present problems in data analysis rather that in the detector.

A typical high resolution neutron diffraction spectrum for a metal powder as obtained in a time of flight experiment is shown in FIG. 3. Correct assignment of the various reflections is necessary before one can obtain the lattice parameter for the crystal. Solid metal objects comprise large numbers of closely packed metal atoms and, thus, will generate comparable neutron diffraction spectra. Of course, in solid objects mechanical strains will act to distort the spatial relationship of adjacent crystal planes, thus giving rise to changes in the neutron diffraction patterns. In metal powders, however, this effect is not observed due to the metal crystals being separated by gaseous filled interstices so that applied forces result in relative movement of the crystals one against another rather than in slippage of the crystal planes themselves.

If more that one chemical phase is present in significant quantity, one should in practice be able to measure the lattice parameters for each, as each will produce their own family of reflections. This parallels the situation in the temperature measurements where the recognition of the element producing a particular resonance enables one to know that the temperature assignment applies to, say, the particular surface of the specimen where that material is positioned.

The widths of the diffraction peaks for most specimens will be limited by the geometry of the beam line. If higher resolution is required it will be necessary to operate at a greater distance, say 80 meters, and to use neutron guides to 'focus' the low energy neutrons so as to achieve an adequate count rate. Unfortunately, the epithermal neutrons cannot be so 'focused', so their count rate will be lower, falling as distance squared.

Existing neutron detector systems do not have the required combination of high pixel density and high count rate for epithermal or near thermal neutrons as will be experienced by the line of sight detector 11.

The proposed multi-pixel detector array uses $Li^6$ Cerium activated glass as a scintillator. This scintillator has a high capture cross section for neutrons and a good scintillation output of about 40 nS half-life. It is to be preferred to organic scintillators in that gamma-ray discrimination is much improved. The pixel size will initially be set at 1 mm×1 mm with the detector elements of 10 mm length aligned along the neutron direction to give reasonable efficiency for all the neutrons in the energy band $1 < E < 100$ eV.

The specification to be met by each pixel includes:

(a) Determination of the time of arrival of the neutron to ±100 nS with respect to a timing pulse provided from the source.

(b) Ability to cope with both neutrons of a pair separated by 100 nS or better, and to operate at a beam rate in the neutron pulse of $10^6$/sec.

(c) To give a high degree of gamma-ray and electron pulse rejection by having good pulse height resolution on the neutrons.

Proper integration of the detector array with suitable fiber optics to set of photomultipliers is necessary to achieve the specification for each pixel. Initially individual photomultipliers will be used for each pixel so that a small system of say 16 pixels can be brought into operation quickly.

A larger detector array comprises a system with 100 pixels feeding their outputs to a small number of multi-anode photomultipliers. The array could be extended to about 1000 pixels.

The Data Input Modules have the task of accepting each detected neutron and tagging it with the pixel numbers and the time of arrival with respect to the accelerator ejection pulse (in the case of a pulsed neutron source) and then passing it on to the main data storage. These requirements are standard around such an accelerator, but the number of neutron counts expected is approximately $10^3$ epithermal neutrons/pulse pixel and approximately $3 \times 10^3$ near thermal neutrons, making approximately $2 \times 10^5$ neutrons/sec/pixel.

Utilization of high count rate neutron detectors with a small pixel size on time of flight beam lines gives one the capability to measure the temperature field with a precision better than ±5° K. at all temperatures above 1000° K. in a reasonable time. Each one can consider in the future arrays of up to say $10^4$ pixels. With the use of thin coatings of suitable materials not present in the bulk specimen e.g. Re, Ir, Au etc one can simultaneously measure the temperature field at several depths in so far as the resonances do not overlap.

Measurement of the temperature by neutrons gives one much more data than is usually obtained from a small number of sensors, and so will lead to a greater understanding of the overall temperature field.

One can also measure temperature transients with comparable accuracy to that of the mean temperature and determine its development with time and as a function of position. This is best done if the transient is repeated a number of times, so that data can be accumulated for a number of nominally identical transitions.

At the same time the transmission of sub-thermal neutrons will give one component of the strain for each pixel in the field of view. The diffracted beam will enable an average figure to be obtained for each strain component. These measures likewise can be made in steady state conditions or with repeated transients.

Such measurements have immediate application for the gas turbine industry, where turbine blades provide an obvious target whose life and performance is limited by thermal effects, both static and cyclic, through thermal fatigue. It is also of significance that one measures the true metal temperatures and stresses below any thermal barriers that may be used.

Thrust bearings are also an attractive target, their performance being similarly restricted by thermal effects. For such a target the neutrons can reveal temperature of the rollers or balls and their housings; in addition one also can evaluate the orientation of the rotation axis of the balls, angular velocity and bulk motion, so determining the position and degree of slip. This could clearly be done as a function of the operating conditions of the bearing.

We claim:

1. A method of simultaneously measuring strain and temperature in an object comprising exposing the object to a neutron beam containing neutrons having energies in the thermal and epithermal ranges, determining a neutron diffraction pattern for thermal neutrons scattered from the object, monitoring the angular distribution of thermal neutrons in the said diffraction pattern and tracking changes therein to determine strain in the object, and substantially simultaneously determining transmission resonance characteristics for epithermal neutrons for elements contained in the object and monitoring doppler broadening of said resonances to determine the temperature in the object.

2. A method according to claim 1 wherein a strain ellipsoid for the object is obtained by resolving changes in angular distribution of the neutron diffraction with respect to three mutually perpendicular axes.

3. A method according to claim 1 wherein the neutrons are obtained from a single neutron source.

4. Apparatus for measuring strain of an object using a neutron diffraction method and for measuring the temperature of the object using a neutron transmission resonance method comprising means for producing a beam containing thermal neutrons and epithermal neutrons, neutron detection means located in the path of the beam for detecting epithermal neutrons transmitted by the object and a plurality of neutron detection means spatially distributed around the object for detecting diffracted neutrons.

5. Apparatus according to claim 4 wherein the locations of the neutron detecting means are angularly adjustable to track movement in the neutron diffraction pattern.

6. Apparatus according to claim 4 wherein the neutron source is pulsed to emit bursts of thermal and epithermal neutrons in a beam directed at the said object.

7. Apparatus according to claim 4 further including means for processing count data and angular position data for the neutron detecting means and to determine changes in the neutron diffraction pattern in order to obtain the vectors of a strain ellipsoid for the object.

* * * * *